United States Patent
Popow

(10) Patent No.: US 11,904,342 B2
(45) Date of Patent: Feb. 20, 2024

(54) SYSTEM AND METHOD FOR SPRAYING HOT-MELT ADHESIVE ONTO GLUED SURFACES

(71) Applicants: AquaCar Group Sp. z o.o., Kostrzyn (PL); Slawomir Popow, Swarzedz (PL)

(72) Inventor: Slawomir Popow, Swarzedz (PL)

(73) Assignee: AquaCar Group Sp. z o.o., Kostrzyn (PL)

( * ) Notice: Subject to any disclaimer, the term of this patent is extended or adjusted under 35 U.S.C. 154(b) by 421 days.

(21) Appl. No.: 17/239,579

(22) Filed: Apr. 24, 2021

(65) Prior Publication Data
US 2021/0339273 A1  Nov. 4, 2021

(30) Foreign Application Priority Data

Apr. 24, 2020 (PL) .................................... 433672
Apr. 24, 2020 (PL) .................................... 433673
Apr. 24, 2020 (PL) .................................... 433674

(51) Int. Cl.
| | |
|---|---|
| *B05B 7/02* | (2006.01) |
| *B05B 12/00* | (2018.01) |
| *C09J 5/06* | (2006.01) |
| *C09J 123/02* | (2006.01) |

(52) U.S. Cl.
CPC .............. *B05B 7/02* (2013.01); *B05B 12/004* (2013.01); *C09J 5/06* (2013.01); *C09J 123/02* (2013.01); *C09J 2423/00* (2013.01)

(58) Field of Classification Search
None
See application file for complete search history.

(56) References Cited

U.S. PATENT DOCUMENTS

| | | | |
|---|---|---|---|
| 4,632,314 A | 12/1986 | Smith et al. | |
| 9,739,399 B1 * | 8/2017 | Dundas | ................... E01C 23/00 |
| 2010/0288366 A1 * | 11/2010 | Shoap | ..................... F16L 11/12 137/1 |

(Continued)

FOREIGN PATENT DOCUMENTS

| | | |
|---|---|---|
| CN | 206746940 U | 12/2017 |
| CN | 209020688 U | 6/2019 |

(Continued)

OTHER PUBLICATIONS

English translation of DE29803637U1.*
English translation of DE3543469A1.*

*Primary Examiner* — Charles Capozzi
(74) *Attorney, Agent, or Firm* — Andrzej Malarz, Esq.

(57) ABSTRACT

A system for spraying hot-melt adhesive onto glued surfaces comprising a melter to heat hot-melt adhesive, an air compressor, a power and control system and a gun. The gun is connected to the melter by a pipe with screw connectors, through which a hot-melt adhesive being heated flows, and the air compressor by an air pipe with screw connectors through which a pressurized compressed air flows. The gun has a nozzle with a hot-melt adhesive outlet or orifice and a compressed air outlet. The pipe through which flows the hot-melt adhesive having a viscosity between 2500 mPa·s and 7000 mPa·s and a temperature between 120° C. and 200° C., and a density between 0.8 kg/dcm$^3$ and 1.4 kg/dcm$^3$, and the air pipe are fitted in an insulating layer of a hose.

15 Claims, 15 Drawing Sheets

(56) References Cited

U.S. PATENT DOCUMENTS

2018/0221897 A1* 8/2018 Collins ................ B29B 7/7615
2022/0390067 A1* 12/2022 Lehman ................ B05B 1/083

FOREIGN PATENT DOCUMENTS

| DE | 3543469 A | * | 6/1987 | ........... B05B 7/0475 |
| DE | 29803637 U1 | * | 7/1999 | .......... B25J 19/0025 |
| GB | P.315901/2286545 A | | 8/1995 | |
| PL | 64959 Y1 | | 8/2009 | |
| WO | 2017/046045 A1 | | 3/2017 | |

\* cited by examiner

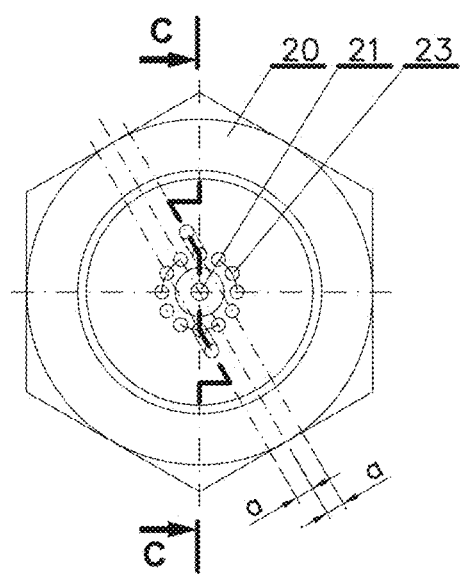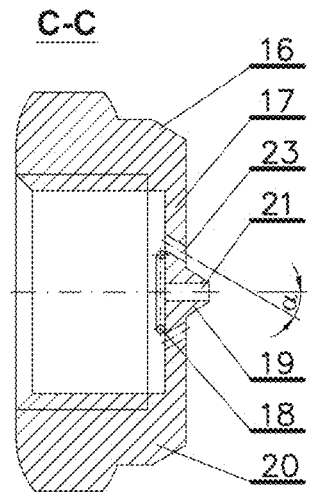
Fig. 10    Fig. 11
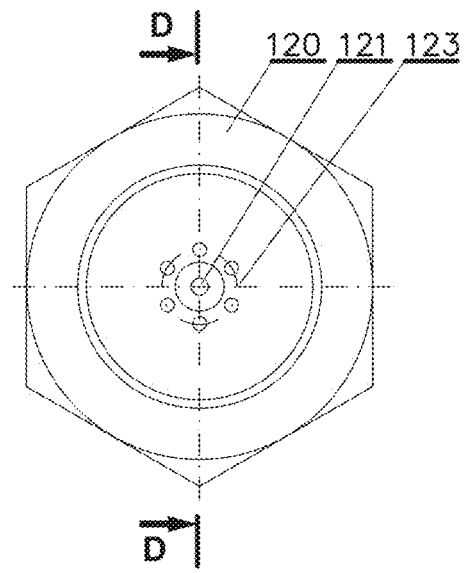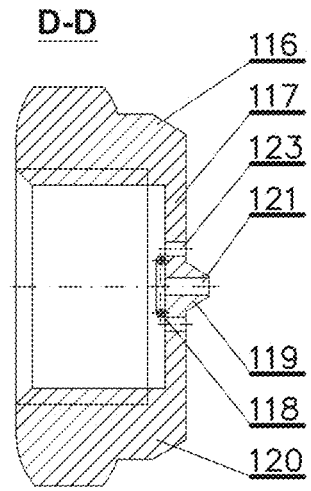
Fig. 12    Fig. 13

SYSTEM AND METHOD FOR SPRAYING HOT-MELT ADHESIVE ONTO GLUED SURFACES

CROSS-REFERENCE TO RELATED APPLICATIONS

This nonprovisional application claims priority, according to U.S.C. sctn. 119, to the Polish Patent Applications No. P.433672, P.433673 and P.433674 filed on Apr. 24, 2020, the contents of which are incorporated herein by reference.

BACKGROUND OF THE INVENTION

Field of the Invention

Technical concept presented herein relates to a system for spraying an adhesive, in particular to a system for spraying hot-melt adhesive onto glued surfaces and a method for spraying hot-melt adhesive onto glued surfaces using the system for spraying hot-melt adhesive onto glued surfaces.

Brief Description of the Background of the Invention Including Prior Art Various elements and products composed of such elements, in particular upholstered furniture, are more and more often manufactured in such a manner that not only wooden elements but also fabrics and elements made of plastics are joined together by means of adhesive, which to a large extent simplifies the manufacturing of furniture and shortens the time required for its execution. Before elements are joined together, the contacting surfaces must be covered with adhesive which is more and more often sprayed using spray guns of various design.

Publication U.S. Pat. No. 4,632,314 A of patent description titled "Adhesive foam generating nozzle" discloses a nozzle assembly adapted with an adhesive spray gun for forming a liquid adhesive/gas solution into a foam. The nozzle comprises a chamber having a rearward end and a forward discharge orifice which is maintained at a pressure less than that required to maintain the gas in solution in the liquid.

In the description of patent application PL 315901 titled "Spraying gun", which claims the priority of patent application GB9424821.8 and is available as the publication GB 2286545 A, is described a spray gun with an improved air control flow distribution to the spray gun nozzle that comprises a die-cast aluminium body and a handle of hard plastics material whereby the body has a spray head and a nozzle. Both of these elements are made from plastics material and have weirs providing an efficient distribution of the flow of air. The aluminium body is permanently joined to the plastics head by a metal ring to provide an efficient mechanical joint and seal between the parts.

In turn, in publication PL64959 pertaining to a utility model titled "Spray gun" has been provided a spray gun for pressure application of semi-fluid plaster or mineral protective and decorative coatings on internal and external facades, having a spray nozzle in the body and closing the spray chamber with attached gravity tank on the one side and a slidingly shaped slider in form of a hollow sleeve from the side of the spray nozzle ending with an outer cone, and on the other hand closed by a plug and having holes in the side wall. The slider is based on the return spring tensioned by the trigger lever of the gun.

International Patent Application Publication WO 2017/046045 A1 titled "Polyolefin hot-melt glue having a low reactivation temperature and high heat stability and use thereof for vacuum deep-drawing lamination" teaches a hot-melt glue composition including at least one atactic poly-α-olefin (APAO) that is solid at 25° C., at least one hydrocarbon resin having a softening point of at least 80° C., measured in accordance with the ring-and-ball method, and at least one maleic-anhydride-grafted wax having a softening point of not more than 150° C., measured in accordance with the ring-and-ball method. Said maleic-anhydride-grafted wax is a maleic-anhydride-grafted polypropylene wax or a maleic-anhydride-grafted polyethylene wax, wherein the proportion of the at least one maleic-anhydride-grafted wax in the hot-melt glue composition is at least 3% by weight.

In addition, in publication CN206746940 U pertaining to a utility model titled "Hot melt adhesive spray gun" is known a hot melt adhesive spray gun comprising a hot-melt adhesive module with a path for conveying the hot-melt adhesive, an air feed mechanism, a heating module for heating the adhesive and a nozzle. The heating module comprises a heat conductor transferring the heat to a spray gun surface from a heating element embedded in the heat conductor. The heat conductor and a spray gun rear end face transferring the heat extend outside forming two heat-isolating ribs for heat transfer.

In addition, from publication CN 209020688 U pertaining to a utility model titled "Hot melt adhesive machine" is known a hot-melt glue device comprising a gun body, a power unit, a melting tank and a throat for providing a melted glue to the gun body from the tank for melting the glue. The melted glue is conveyed to the gun body under pressure using the power unit.

The main disadvantage of this system and method is a considerable work demand at gluing and problems to keep a temperature required for the specific adhesive as the gun has to be hold above the sprayed surface by the person spraying the adhesive.

SUMMARY OF THE INVENTION

Purposes of the Invention

It is an object of the present invention to provide a system, that would allow for precise applying the hot-melt adhesive onto chosen and exactly defined surfaces to be glued as well as for providing a method for spraying hot-melt adhesive onto glued surfaces by use of the system for spraying hot-melt adhesive mentioned earlier that in considerably way lightens working persons at furniture manufacturing, especially upholstery furniture.

These and other objects and advantages of the present invention will become apparent from the detailed description, which follows.

BRIEF DESCRIPTION OF THE INVENTION

The object of the invention is a system for spraying hot-melt adhesive onto glued surfaces. The system for spraying an adhesive comprises a melter for heating hot-melt adhesive, an air compressor, a power and control system and a gun. The gun of said system is connected to the melter by a pipe with connectors through which heated hot-melt adhesive flows. Furthermore, the gun is connected to the air compressor by an air pipe with connections through which pressurized compressed air flows. The gun has a nozzle with a hot melt adhesive outlet and a compressed air outlet. The pipe, through which the hot-melt adhesive flows with a viscosity between 2500 mPa·s and 7000 mPa·s at a temperature between 120° C. and 200° C.

and a density between 0.8 kg/dcm$^3$ and 1.4 kg/dcm$^3$, and the air pipe are fitted in an insulating layer of a hose. The throughput of the pipe through which the heated hot melt adhesive flows is between 0.5 kg/h and 1.5 kg/h, while the throughput of the air pipe is between 0.1 m$^3$/min and 0.6 m$^3$/min.

It is thereby particularly advantageous that the connection hose is suspended by means of a system for suspending flexible elements comprising a holder for holding at least one flexible element, whereby the holder is attached to a mobile system movable along a boom which is attached to a stand by means of an adjusting system that is mounting of boom to a movable construction or a fixed element. Thanks to the suspension of the connection hose, a hose and gun weight is transferred to the construction of mobile system and makes the maintenance work of the gun more ergonomic as compared to known solutions.

According to one of preferred embodiments a particularly efficient operation of the device according to the invention can be seen in that the holder comprises at least one spring loosely and moveable wound on the connection hose, which is suspend mounted by means of at least one hanger to at least one mobile system, whereby one ends of the hangers are fixed to the mobile system whereas the other ends of the hangers are fixed to the spring at its ends or midpoint.

A further improvement can be achieved in that the adjusting system comprises a stand with a pole and at least two clamps seated on the stand's pole and a mandrel to which the boom is attached, whereby the clamps, that are adjustably fixed along the stand's pole by a screw, have seats in which the ends of the mandrel are pivotally seated around its vertical axis.

Yet a further improvement can be achieved in that the mobile system comprises a longitudinal bearing with a circular internal or rectangular cross-section having multiple rows of balls preferably spaced evenly at a predetermined distance around a circumference of a bearing interior and in contact with an outer surface of the boom, and which is loosely fitted on the boom, and which is placed in a housing with either snap-in holders or slings.

Another preferred development of the invention foresees that the pipe through which heated hot-melt adhesive flows is placed adjacent to the air tube, and comes into contact with the air pipe in the section of the connection hose where an insulating layer of the hose is fitted.

Yet further preferred development of the invention foresees that the air pipe is placed inside the tube through which the heated hot-melt adhesive flows along the section of the connection hose where an insulating layer of the hose is fitted.

Next preferred development of the invention foresees that the pipe through which the heated hot-melt adhesive flows is placed inside the air pipe along the section of the connection hose where an insulating layer of the hose is fitted.

A further improvement can be achieved in that the pipe through which the heated hot-melt adhesive flows is connected by a connector to an inlet port with a through-hole connecting the outlet of the tube with the hot-melt adhesive container located in the front part of the gun.

According to one design variant of the invention it is advantageous that at least one heater and at least one temperature sensor may be inserted in walls of the gun, which are in contact with the hot melt adhesive container whereby the heater and the temperature sensor may be fitted in recesses situated in a wall separating the hot melt adhesive container from an inner chamber of the gun.

According to another design of the invention it is advantageous that the heater is placed immediately adjacent to the gun nozzle and the temperature sensor is directly connected to the temperature controller of the power and control system, which controls the operation of the hot melt adhesive heater located in the melter to allow fast response of the adhesive heater controlled by the power and control system to adhesive temperature fluctuations in the gun container and the inner chamber of the gun may comprise a button pivotally mounted on the gun housing and protruding partially beyond the housing, to which a pusher with a needle may be attached, the end of which reaches the outlet of hot melt adhesive in order to prevent adhesive from flowing out when the gun is not in use and the inner chamber of the gun may comprise an internal air line with a valve that cuts off the flow of compressed air through the internal air line by the action of the button on the valve, and the internal air line may connect the air port of the gun with air channels connected to the compressed air outlet, whereby such outlet may be, in particular, provided by openings in the front wall of the nozzle surrounding the hot melt adhesive outlet that is placed in the center of the nozzle and whereby the outlet of hot-melt adhesive has a truncated cone shape and the air openings have longitudinal symmetrical axes inclined at an angle α to a symmetrical axis of the nozzle, and at least one air opening may have a symmetrical axis within a plane placed at a distance a from the plane passing through the longitudinal symmetrical axis of the nozzle.

Yet it is another object of the present invention to provide a composition of hot-melt adhesive for spraying using the system for spraying hot-melt adhesive onto glued surfaces used in particular for manufacture of upholstery furniture that may comprise not more than 55.0% of hydrocarbon resin, not more than 6.0% of polybutene, not more than 1.5% of antioxidant, not more than 27.0% of copolymer mixture, and not more than 27.0% of polyolefin polymer by weight.

Another preferred development of the invention foresees that the composition of hot melt-adhesive comprises 48.6% of hydrocarbon resin, 5.5% of polybutene, 1.05% of antioxidants, between 22.8% and 23.0% of polyolefin polymer, preferably 22.9%, and copolymer mixture in an amount complementary to 100.0% of the components, preferably 22.4%.

Furthermore, the object of the invention is a method for spraying hot-melt adhesive onto glued surfaces using a system for spraying hot-melt adhesive onto glued surfaces comprising a melter for heating hot-melt adhesive, an air compressor, a power and control system and a gun connected to the melter by a pipe with connectors through which heated hot-melt adhesive flows and connected to the air compressor by an air pipe with connectors through which pressurized compressed air flows directed to surfaces to be glued and having a nozzle with a hot melt adhesive outlet and a compressed air outlet. According to the said method to a ferrule of gun a hot-melt adhesive having viscosity of 2500 mPa·s to 2800 mPa·s and density of 0.8 kg/dcm$^3$ to 1.4 kg/dcm$^3$, preferably 0.9 kg/dm$^3$ to 0.95 kg/dm$^3$ and heated to a temperature between 120° C. and 200° C. is applied under pressure of 1200 kPa to 4200 kPa through a pipe having a throughput between 0.5 kg/h and 1.5 kg/h and fitted in a hose inside its insulating layer whereas to an air ferrule of the gun through an air pipe having a throughput from 0.1 m$^3$/min to 0.6 m$^3$/min and placed in the hose in its insulating layer in area of the adhesive supply pipe air is applied under pressure of 100 kPa to 1000 kPa.

BRIEF DESCRIPTION OF THE DRAWINGS

These aims together with other objects and advantages which will become subsequently apparent reside in the details of construction and operation as more fully hereinafter described and claimed, reference being had to the accompanying drawings forming a part hereof, wherein the same numerals refer to the same parts throughout.

In drawings

FIG. 10 shows a front view of one embodiment of the nozzle, FIG. 11 shows a cross-sectional view of the nozzle along the line C-C in FIG. 10, FIG. 12 shows a front view of another embodiment of the nozzle, FIG. 13 shows a cross-sectional view the nozzle along the line D-D in FIG. 12.

DETAILED DESCRIPTION OF INVENTION AND PREFERRED EMBODIMENT

In describing a preferred embodiment of the invention illustrated in the accompanying drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 1:
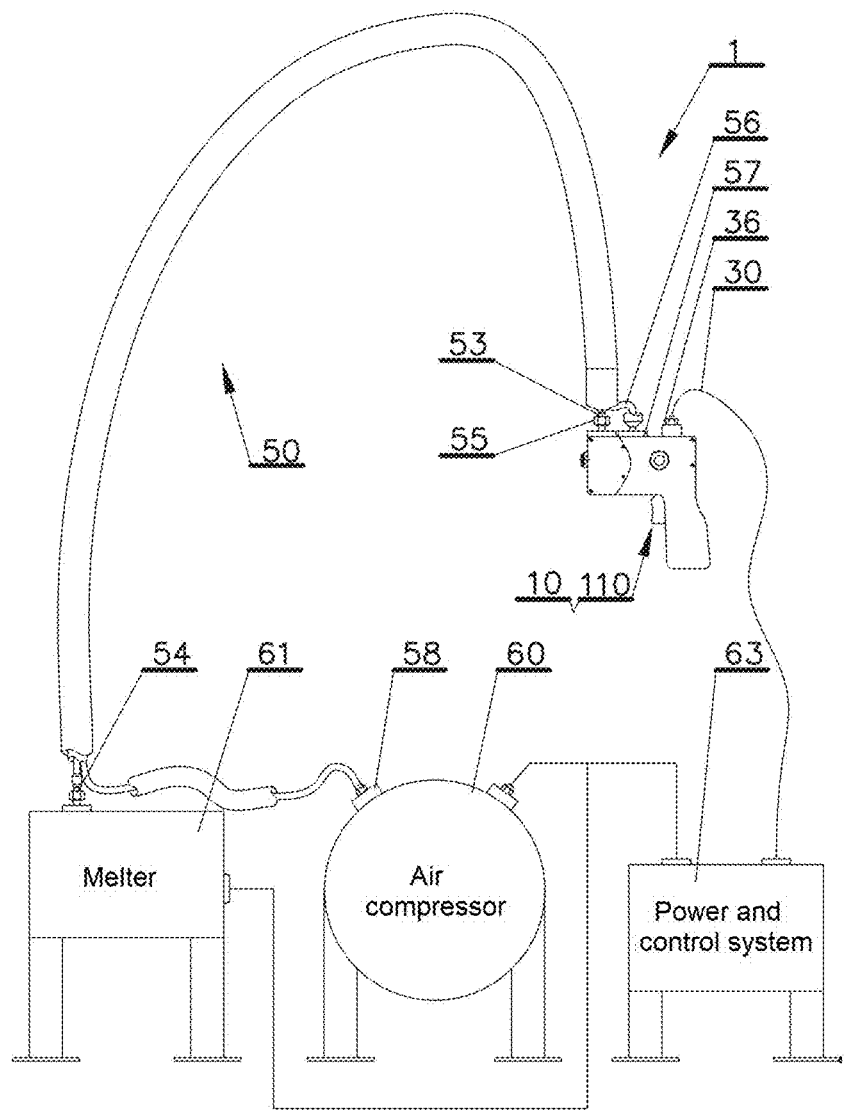
FIG. 1 shows schematically one of embodiments of a system for spraying hot-melt adhesive onto glued surfaces according to the invention.
Figure 2:
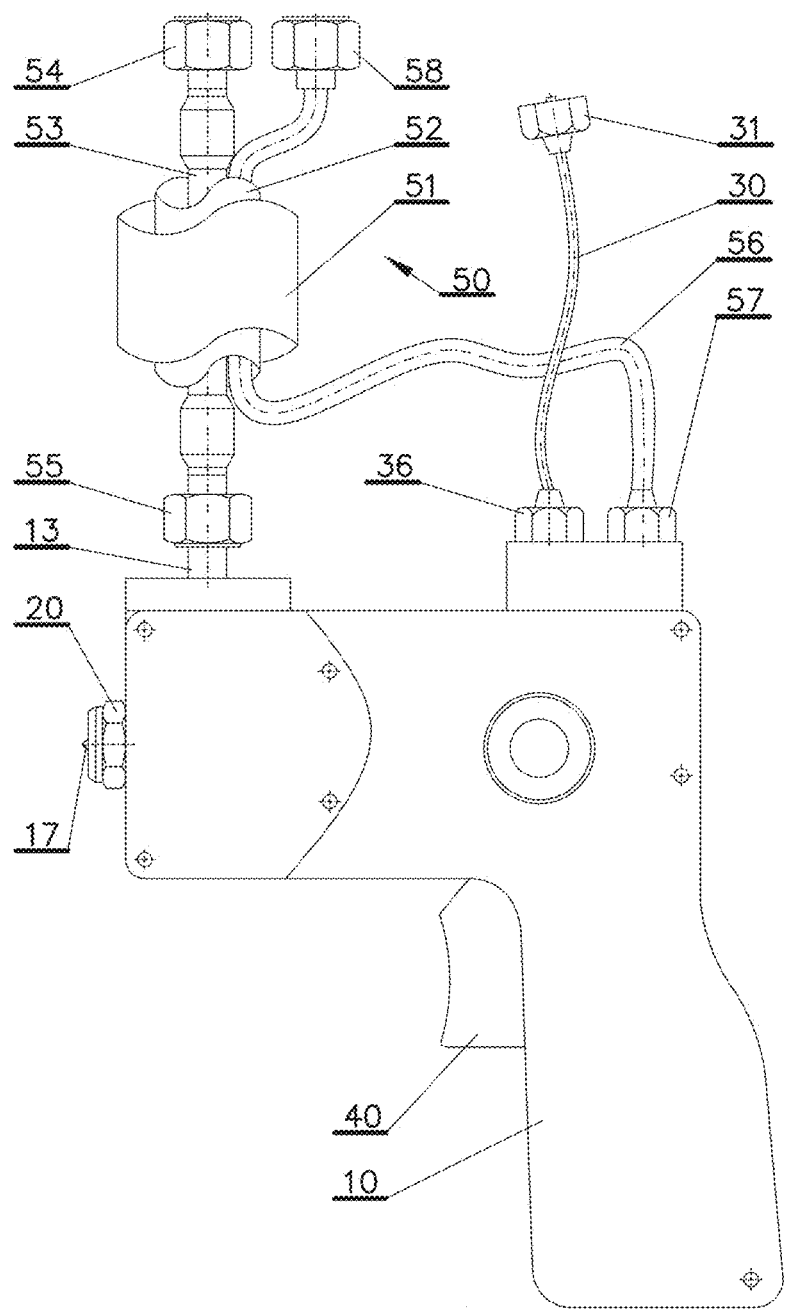
FIG. 2 shows schematically one of embodiments of a gun with a pipe with connectors.

Referring to the drawing, FIG. 1 schematically shows one of embodiments of a system 1 for spraying a composition of adhesive, specifically a hot-melt adhesive onto glued surfaces according to the invention. The system in its most simplified shape comprises a heating device, specifically a melter 61 to heat hot melt adhesive, an air compressor 60, a power and control system 63 and a gun 10, 110. To the gun 10, 110 is fed the hot-melt adhesive at a temperature of 100° C. in one embodiment, and at a temperature of 200° C. or even 220° C. in another embodiment, and in the preferred embodiment at a temperature of 180° C., connected by a connection hose 50 to the melter 61, equipped with a gear or pressure pump, and an air compressor 60. The power and control system 63 is connected to the gun 10, 110 by a wiring harness 30 terminated by an electrical connector 36 with a plug 31, as shown in FIG. 2, as well as to the air compressor 60 and the melter 61.

The connection hose 50 in the embodiment shown in FIG. 1 is a hose without its own heating and has a pipe 53 with screw connectors 54, 55 through which the heated hot-melt adhesive flows, and an air pipe 56 with connectors 57, 58 through which compressed air flows at a pressure of 100 kPa in one embodiment, 1000 kPa in another, and 300 kPa in a preferred embodiment. In one embodiment, the air fed to the gun is at an ambient temperature and is pressurized up to 1000 kPa. The ambient temperature can reach 5° C., 10° C., 20° C., 25° C. and even more degrees Celsius.

Figure 3:
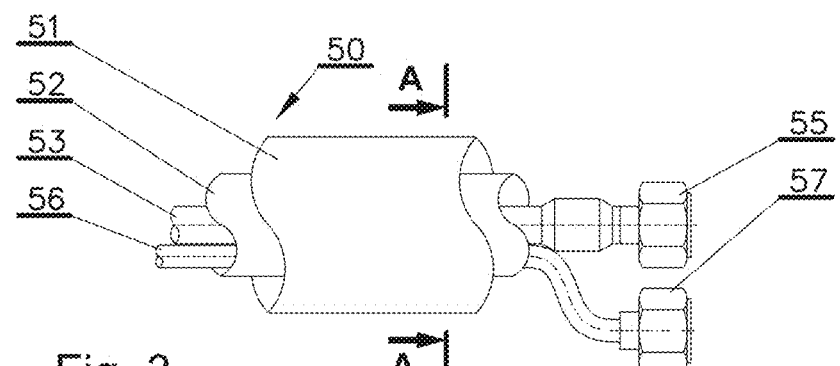
FIG. 3 shows schematically one of embodiments of a hose and screw connectors.
Figure 4:
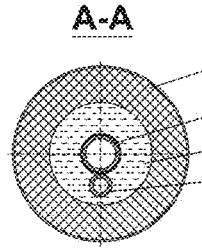
FIG. 4 shows a cross-sectional view of the hose along the line A-A in FIG. 3.
Figure 5:
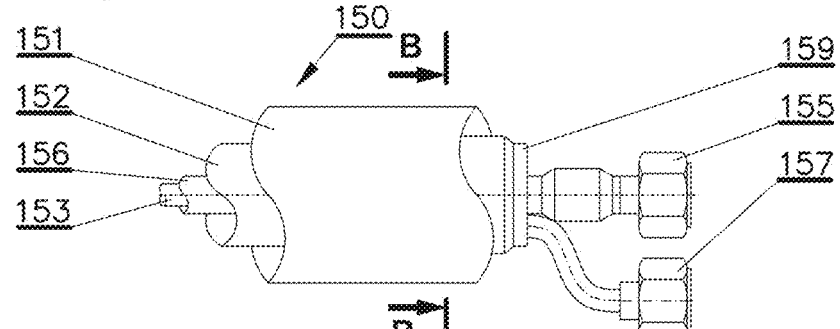
FIG. 5 shows schematically another embodiment of the hose and screw connectors.
Figure 6:
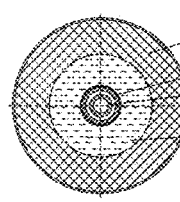
FIG. 6 shows a cross-sectional view of the hose along the line B-B in FIG. 5.

Other embodiments of the connection hose are shown in FIGS. 3, 4, 5, and 6. Both the connection hose 50 shown in FIG. 3 and FIG. 4 and the connection hose 150 shown in FIG. 5 and FIG. 6 are multi-layered, Depending on the diameter of the air pipe 56 and the pipe 53 through which the heated hot-melt adhesive flows, the hose 50 in FIG. 3 and FIG. 4 has an inner diameter of 6 mm, 6 mm, 10 mm, 12 mm, 14 mm, or even more than 14 mm, which means that the most common inner diameter of the hose is between 6 mm and 14 mm. An outer protective layer 51 of the jacket is usually 14 mm, 16 mm, 18 mm, 20 mm or 44 mm. The protective layer 51 surrounds an insulating layer 52, in which the air pipe 56 and the pipe 53, through which the heated hot melt adhesive flows, and is positioned near the air pipe 56 and is in contact with it along the hose 50, along which the insulating layer 52 of the hose 50 is placed, so that the air pumped into the gun is heated spontaneously by the heated hot-melt adhesive. Common air pipe diameters are 8 mm, 10 mm, 12 mm, and their jacket thickness is 2 mm, 3 mm or 4 mm.

Similarly to the connection hose 50 shown in FIG. 3 and FIG. 4, the connection hose 150 shown in FIG. 5 and FIG. 6 has an outer protective layer 151 which surrounds an insulating layer 152. The difference between the two hose embodiments is that an air pipe 153 with a connector 157 is fitted in a pipe 156 with a connector 155 through which the heated hot-melt adhesive flows, and separation of the pipes 153, 156 at both ends is ensured by splitters 159 placed at the end of the insulating layer of the hose 150. In this embodiment, an inner diameter of the pipe, which is an outer pipe, is larger than an outer diameter of the inner pipe, which has a diameter of 2 mm, 3 mm, 4 mm, or 5 mm. In one embodiment, the air pipe 56, 153 and the pipe 53, 156 through which the heated hot-melt adhesive flows are made of teflon. Both the air pipe 56, 153 and the pipe 53, 156 through which the heated hot melt adhesive flows are adapted to operate at a temperature up to 260° C. and at a pressure up to 1200 kPa or even up to 14000 kPa. In yet another embodiment, the pipe through which the heated hot melt adhesive flows is placed inside the air pipe within a section of the connection hose where the insulating layer of the hose is fitted.

FIG. 2 schematically represents one embodiment of the gun 10 with the connectors 54, 55, 57 and 58 of the connection hose 50. A more detailed design of the guns 10, 110 is shown in FIGS. 7 and 8.

Figure 7:
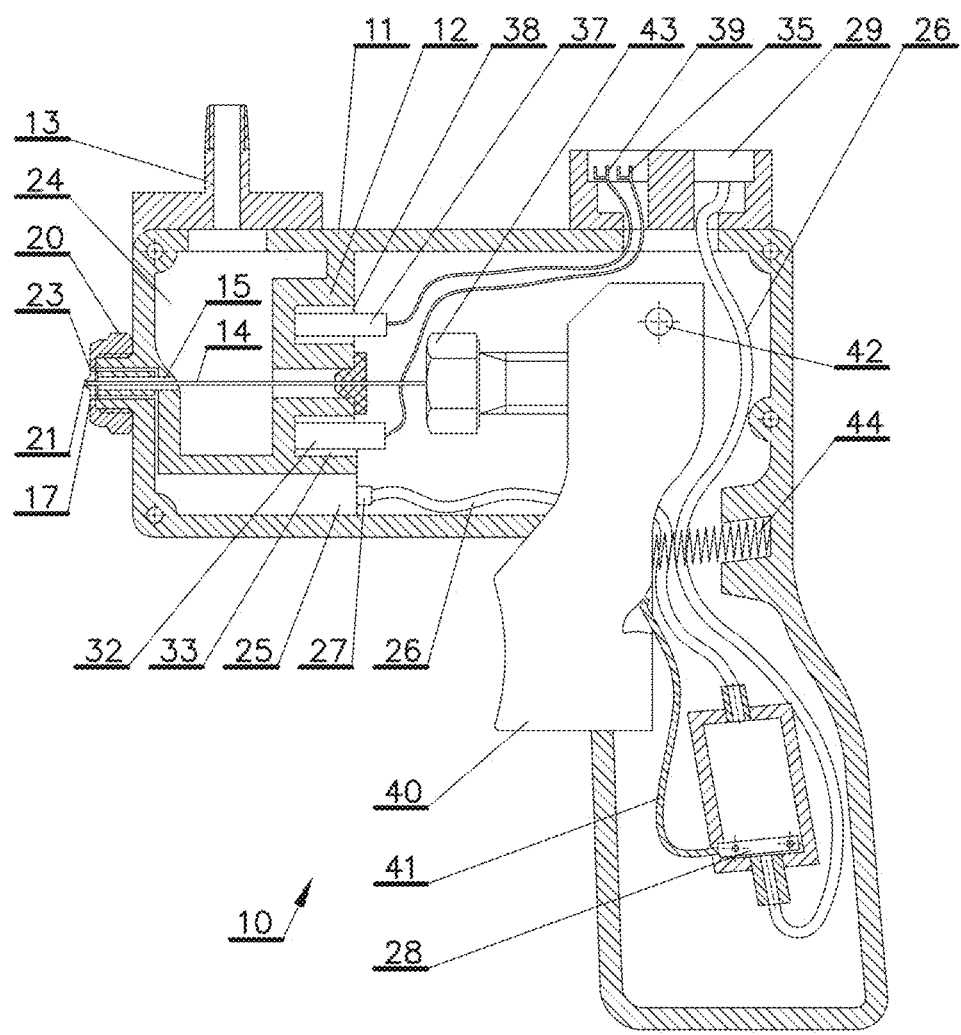
FIG. 7 shows schematically construction of one of embodiments of the gun.

The gun 10 shown in FIG. 2 and FIG. 7 has a housing 11 in an interior of which, in a front part of the gun 10, a hot melt adhesive container 24 is fitted, which ensures that the temperature of hot melt adhesive leaving a nozzle of the gun is maintained at a desired and preset value without fear that the hot-melt adhesive will be cooled as it flows through through-holes in the housing of the gun 10. At least one heater 32 with a wire 39 and at least one temperature sensor 37 are fitted in walls of the gun 10 that surround the hot melt adhesive container 24 with a ferrule 13. The heater 32 is placed inside a recess 33, immediately by the nozzle so that adhesive leaving the gun has the same temperature as the gun heater. The temperature sensor 37 is placed in a recess 38, and both recesses 33, 38 are accessible in particular from a side of wall 12 separating the hot melt adhesive container 24 from an inner chamber of the gun 10 fitted mainly inside a grip part of the gun 10. The temperature sensor 37 is directly connected via a wire 35 to a temperature controller which controls the heater of hot melt adhesive placed in the melter to allow fast response of the adhesive heater controlled by the power and control system 63 (shown in FIG. 21) to adhesive temperature fluctuations in a gun container, which also improves the temperature stability of adhesive leaving the gun.

The inner chamber of the gun 10 comprises also an inner air line 26 with an air ferrule 29 and a button 40 partially protruding beyond the housing 11 of the gun 10. The button 40 is mounted pivotally in a joint 42 in the gun housing 11 and is leaned on a spring 44. A pusher 43 with a needle 14, the end of which reaches an outlet or orifice 21 of the hot melt adhesive, is attached to a part of the push button 40 which is placed opposite the hot melt adhesive container 24. The outlet 21 of the hot melt adhesive is connected to the hot melt adhesive container 24 by a channel 15, through which the hot melt adhesive flows into the outlet 21 of the hot-melt adhesive that is closed by the end of the needle 14. When the button 40 is pressed, the pusher 43 with the needle retracts, which allows the hot-melt adhesive to flow out and be sprayed. In the inner chamber of the gun 10, the inner air line 26 is fitted with a cut-off valve 28, cutting off the flow of the compressed air that flows through the inner air line 26 upon the action of the button 40 on the valve 28 through the spring element 41. The above-mentioned inner air line 26 connects the air ferrule 29 of the gun 10 through a connector 27 to air ducts 25 connected to an outlet 23 of the compressed air. The compressed air outlet 23 in the embodiments of the invention shown in FIGS. 2 and 7 are openings in a front wall 17 of a nozzle 20, shown in FIG. 11, surrounding the hot-melt adhesive outlet 21.

Figure 8:
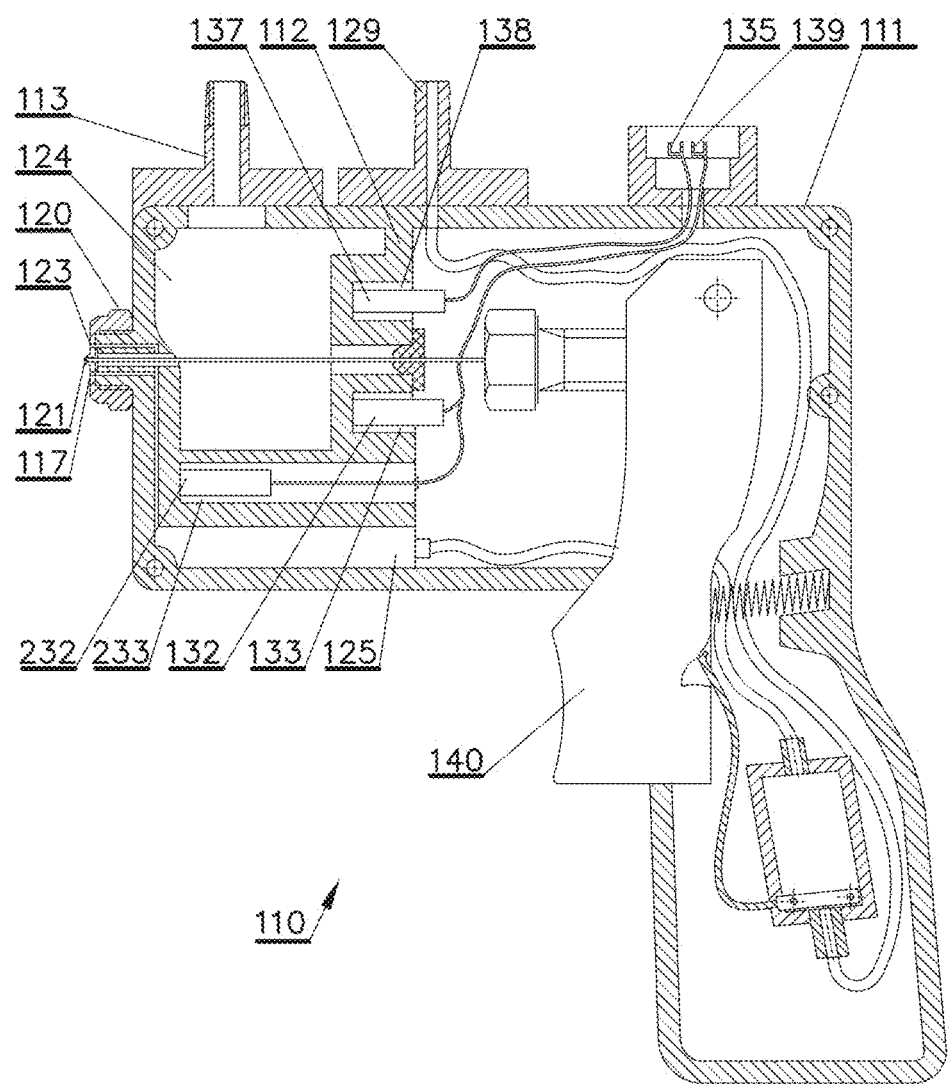
FIG. 8 shows schematically construction of another gun.

The gun 110 shown in FIG. 8 is similarly designed to the gun 10 in FIG. 7 and has a housing 111, inside of which there is a container 124 of the hot-melt adhesive fitted at the front of the gun 110 and an inner air pipe connecting an air connector 129 to air ducts 125 and a button 140. In this embodiment, the hot-melt adhesive container 124 is much larger than the gun 10 container shown in FIG. 7, which reduces temperature fluctuations of the hot-melt adhesive leaving an outlet 121 of the hot melt adhesive. However, the hot melt adhesive container 124 may have smaller dimensions than the gun 10 container shown in FIG. 7, when the gun is intended for bonding small surfaces, which limits a demand for the adhesive. In such a case, the adhesive is quickly heated to a required temperature, for example after a downtime.

In walls of the gun 110, which surround the hot melt adhesive container 124 with a screw connector 113, heaters 132, 232 and temperature sensors 137, only one of which is shown in FIG. 8, are located. The heater 132 with wires 139 is fitted in a recess 133, and the temperature sensors 137 with wires 135 are fitted in recesses 138 which are positioned in particular in a wall 112 separating the hot melt adhesive container 124 from an inner chamber of the gun 110 placed mainly in a grip part of the gun 110. The heater 232 is placed immediately by the nozzle 120 of the gun 110 and is fitted in a recess 233. Such arrangement of the heater ensures a proper temperature of the adhesive getting out through an opening or openings made in a front wall 117 of the nozzle 120. Openings in the front wall 117 of the nozzle 120 surrounding the hot melt adhesive outlet 121 or orifice serve as an outlet of the compressed air.

Figure 9:
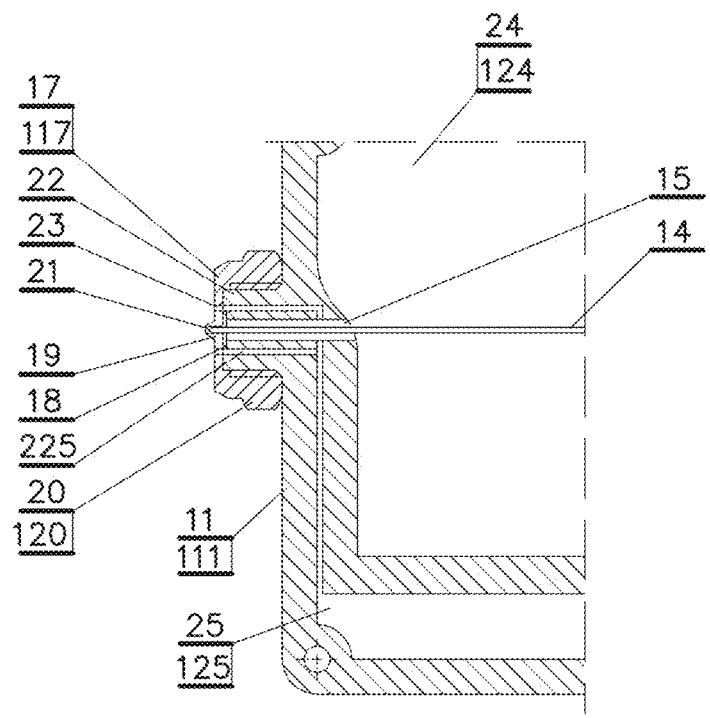
FIG. 9 shows a cross-sectional view of a fragment of a body of the gun at connection to one embodiment of a nozzle.

FIG. 9 shows a cross-sectional view of a part of the housing 11, 111 of the gun shown in FIG. 2, FIG. 7, and FIG. 8, at the point where it is connected by a threaded connection 22 to the nozzle selected from the nozzles 20, 120, shown in FIGS. 10-13. FIG. 9 shows in detail the connection of the adhesive container 24, 124 with the channel 15 through which the hot-melt adhesive flows into the outlet 21 closed by the end of the needle 14, and the connection of the air channels 25, 125 with inlet channels 225 and the air openings 23. The nozzle 20, 120 has a seal 18 at the side of the gun. The hot melt adhesive outlet 21, situated centrally in a conical protrusion 19 of the front wall 17,117, is surrounded by the air openings 23.

FIGS. 10-13 show various embodiments of nozzles screwed onto the threaded part of the gun 10, 110. FIG. 10 shows a front view of one embodiment of the nozzle 20, while FIG. 11 shows its cross-sectional view. In this embodiment, the nozzle 20 with a body 16 comprises a hot-melt adhesive through-hole connecting the hot-melt adhesive outlet 21 to the hot melt adhesive container 24. The diameter of the opening for hot melt adhesive in the given embodiments is 0.8 mm, 1.0 mm, 1.2 mm, or even 1.5 mm. On the gun side, the nozzle 20 has a seal 18. The hot melt adhesive outlet 21, fitted centrally in a conical protrusion 19, is surrounded by the air openings 23 placed in the front wall 17 of the nozzle 20, moreover, in this embodiment, the outlet 21 is surrounded by twelve air openings 23 whose longitudinal symmetry axes are inclined at an angle α to a symmetry axis of the nozzle. In this embodiment, at least one air opening 23 has a symmetry axis placed at a distance a from a plane passing through the longitudinal symmetry axis of the nozzle 20. The distance a may equal 1.0 mm, 1.5 mm, 2.0 mm, 2.5 mm, or even be greater than 3.0 mm. In yet another embodiment not shown in the figure, the hot melt adhesive outlet is placed centrally in a truncated cone shaped protuberance, and is surrounded by the air openings which are placed in the front wall of the nozzle and whose longitudinal symmetry axes lie in planes passing through the longitudinal symmetry axis of the nozzle. In turn FIG. 12 shows a front view of yet another embodiment of the nozzle 120, which has six air openings 123 surrounding the hot melt adhesive outlet 121. FIG. 13 shows a cross-sectional view of another embodiment of the nozzle 120 with a nut-shaped body 116 ended with the front wall 117 comprising a conical protrusion 119 with a symmetry axis placed in the symmetry axis of the nozzle. On the gun side, the nozzle 120 has a seal 118. The hot melt adhesive outlet 121 is surrounded by the air openings 123 whose longitudinal axes are placed parallelly to the symmetry axis of the nozzle 120. The hot melt adhesive outlet 121 in this embodiment has a diameter equal to the diameter of the smaller base of the truncated cone but may also have a smaller diameter. In one embodiment, the vertical angle of the protrusion 119 is 75°, in another 90°, then 105° and 120°. In other embodiments, the nozzle has 6, 8, 10, 14, or more air openings. Owing to a greater number of air openings, adhesive may be distributed into small particles with improved efficiency and sprayed onto surfaces to be bonded, which increases the possibility of bonding by applying the adhesive to one of the surfaces to be bonded together, and not as before, when the adhesive had to be applied mostly to both contacting surfaces to be bonded. Moreover, better adhesive breakdown not only results in better bonding quality but also results in limiting the adhesive consumption. The nozzle, having the conical protrusion 19, 119, allows the adhesive to be sprayed from various distances from the surfaces to be bonded, which has not been possible with flat nozzles used so far. Common diameters of the nozzle air openings in the embodiments described above are 0.3 mm, 0.4 mm, 0.6 mm, or even 0.8 mm.

Figure 14:
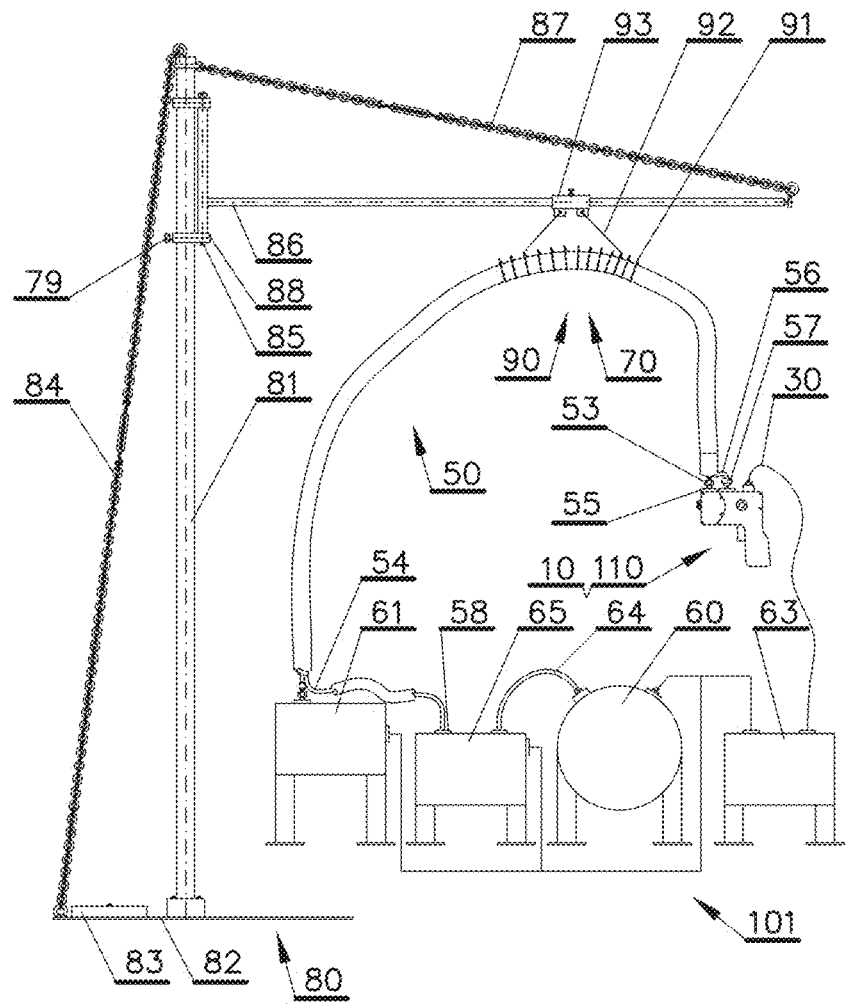
FIG. 14 shows schematically another embodiment of a system according to the invention for spraying the hot-melt adhesive on surfaces to be bonded.

FIG. 14 schematically shows another embodiment of the system 101 for spraying the hot-melt adhesive on surfaces to be bonded compliant with the invention, which is similar to the system 1 for spraying the hot-melt adhesive, shown in FIG. 1. The system 101 shown in FIG. 14, compared to the system 1 in FIG. 1, additionally has a heater 65 of air pressed to the hose 50. The remaining devices, such as the melter 61 for heating the hot-melt adhesive, the air compressor 60, the power and control system 63, and the gun 10 or 110, connected to the melter 61 by the pipe 53 with the connectors 54, 55, through which the heated hot-melt adhesive flows, and connected to the air compressor 60 by the air pipe 56 with the connectors 57, 58, perform similar functions as in the system in FIG. 1. In the embodiment shown in FIG. 14, the air compressed by the air compressor 60 is heated by the air heater 65 connected to the air compressor 60 by an external air hose 64. Compared to the system in FIG. 1, the air heater 65 is an accessory.

The connection hose 50, which houses the air pipe 56 and the pipe 53, through which the heated hot melt adhesive flows, is suspended by a holder 90 of a system 70 for suspending flexible elements. The holder 90 is movable along an arm 86, which is mounted rotatably around a vertical axis and vertically movable along a stand 81 of a system 80 for suspending the connection hose 50. The vertical position of the arm 86 on the stand 81 is determined by clamps 85 with a setting screw 79, whereby in seats of clamps 88 a spindle is located, which keeps the arm in a horizontal position. Additionally, the horizontal position of the arm 86 is maintained by a tensioner 87. The stand 81 of this system is seated on a base 82 with a weight 83. The stand 81 is held in the vertical position by a stay 84. A spring 91 of the holder 90 is loosely wound on the connecting hose 50, which, by means of hangers 92, is suspended to a mobile system 93 of the holder 90, in particular to a housing 94 of an elongated bearing 98 movable along the arm 86 and slide-fitted on the arm 86. The hangers 92 in this embodiment are bars or pipes.

Figure 15:
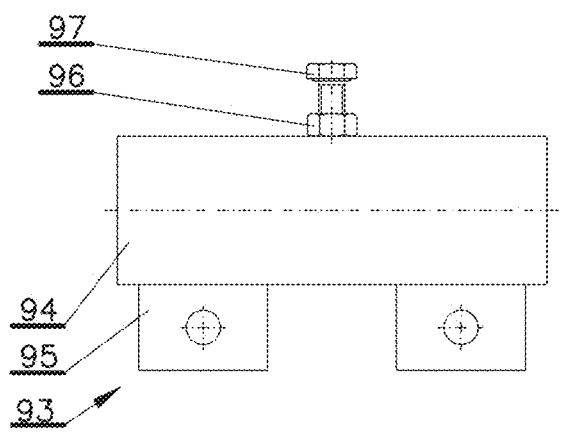
FIG. 15 shows a side view of one embodiment of a mobile system of a holder.
Figure 16:
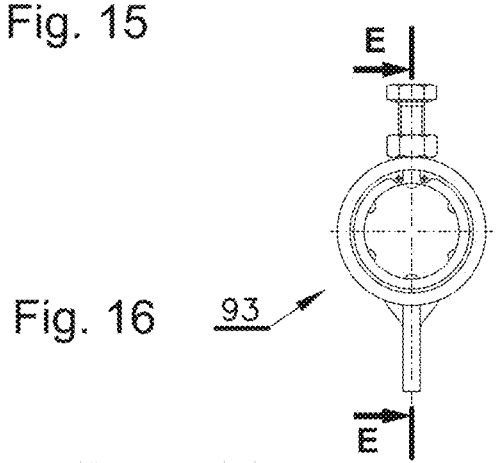
FIG. 16 shows a front view of the mobile system with the bearing shown in FIG. 15.
Figure 17:
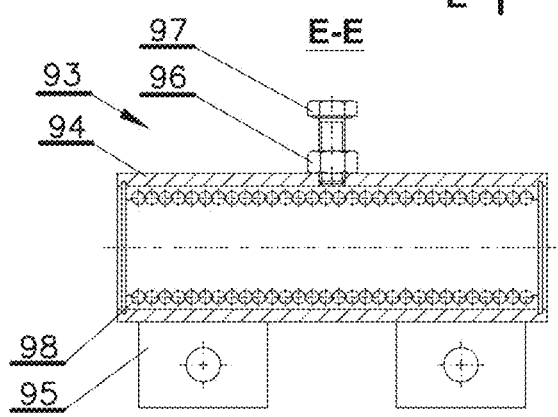
FIG. 17 shows a longitudinal section of a housing of the bearing along the line E-E in FIG. 15.

Construction of the mobile system 93, as well as the bearing 98 and its housing 94, is shown in detail in FIGS. 15-17. The said bearing 98 in this embodiment is loosely fitted on the arm 86, which allows the holder 90 of the mobile system 93 to move along the arm 86, in particular with a circular cross-section. According to one embodiment, the bearing has a length exceeding an inner diameter of the bearing 98, specifically, the length is three times the inner diameter of the bearing 98. In one embodiment, the bearing length is 80.0 mm and, in another, the bearing length is 100.00 mm or even more. The bearing 98 has numerous rows of balls preferably evenly spaced at a predetermined distance around the circumference of the bearing interior, which reduces frictional resistance when the bearing is moved along the arm, preferably of circular cross-section. The bearing 98 is fitted inside a tube-shaped housing 94 and is locked in the housing by a bolt 97 with a lock nut 96. In the solution shown in FIGS. 15, 16, and 17, snap-in holders 95 are attached to the housing 94, to which upper ends of the hangers 92 are attached, the lower ends of which are attached to the spring 91 of the holder 90.

Figure 18:
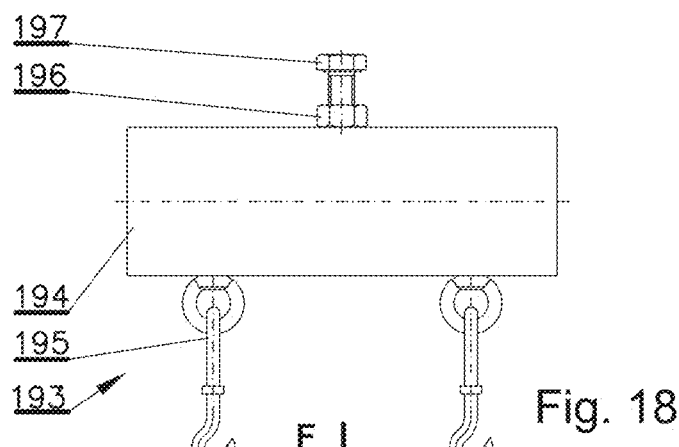
FIG. 18 shows a side view of one embodiment of a mobile system of a holder.
Figure 19:
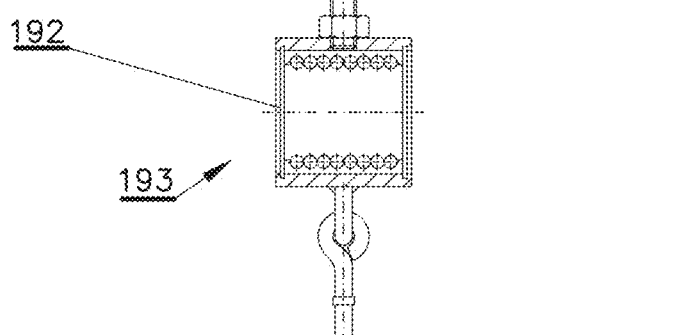
FIG. 19 shows a front view of the mobile system with the bearing shown in FIG. 18.
Figure 20:
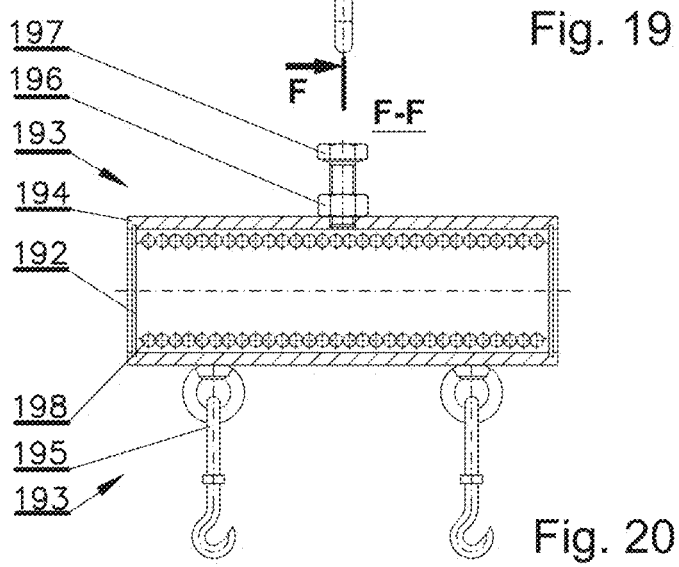
FIG. 20 shows a longitudinal section of a housing of the bearing along the line F-F in FIG. 18, FIG. 21 and FIG. 22 show schematically another embodiment of a system according to the invention for spraying the hot-melt adhesive on surfaces to be bonded.

FIGS. 18, 19, 20 show in detail another embodiment of a mobile system 193 with a bearing 198 and its housing 194. Similarly to the bearing 98 shown in FIG. 15, the bearing 198 shown in FIG. 18 is loosely fitted on one of booms 330, 430, shown in one of FIGS. 23, 24, which allow movement of the mobile system 93, 193 along the boom 330, 430, in particular with a rectangular cross-section. The bearing 198 has numerous rows of balls touching an external surface of the boom 330, 430, shown as examples in FIGS. 23, 24, which are preferably evenly spaced at a predetermined distance in a width at a top and bottom of a bearing interior, which reduces frictional resistance when the bearing is moved along the arm, preferably with a rectangular cross-ssection. The bearing 198 is fitted inside a rectangular-shaped housing 194 and is locked in the housing by fixing elements 192 and a bolt 197 with a lock nut 196. In the solution shown in FIGS. 18, 19, 20, holders or handles 195 with slings are attached to the housing 194. The slings are fixed to the spring 91, 391, 491, according to the solutions shown in FIGS. 14, 18 and 19.

Figures 21, 22:
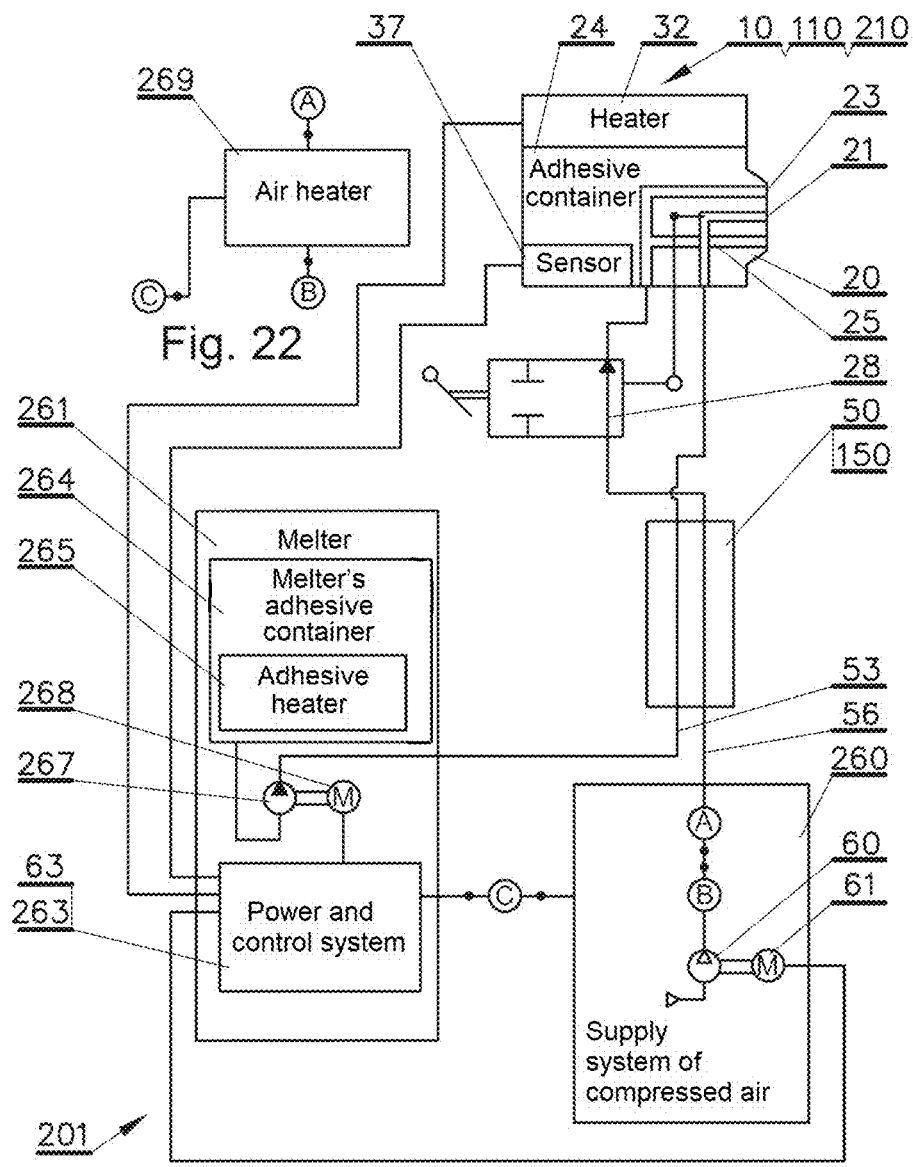

FIG. 21 represents schematically another embodiment of a system 201 for spraying hot-melt adhesive on surfaces to be bonded according to the invention. The system 201, like the systems 1, 101 in FIG. 1 and FIG. 14, respectively, comprises the gun 10, 110, 210 in various versions as previously described, a heating device, specifically a melter 261 for heating hot-melt adhesive, a compressed air supply system 260, specifically an air compressor, and the power and control system 63, 263 integrated within the melter 261. The gun 10, 110, 210 is provided with the heater 32, the sensor 37, the hot melt adhesive container 24, into the outlet 21 of which, closed by the needle, is pumped hot-melt adhesive of a temperature between 100° C. and 220° C. through the tube 56 of the connection hose 50, 150 shown in FIG. 3 or 5 with a melter container 264 of the melter 261 for hot-melt adhesive, equipped with an adhesive heater 265 and a gear pump 267 driven by a motor 268 or a pressure pump. In the latter case, the pressure pump is driven by compressed air with an output determined by a pressure regulator interacting with the power and control system 63, 263. The gun 10, 110, 210 is connected by the air tube 53 through a valve 28, shown in FIG. 21 in the open position, to an air compressor 60 driven by a motor 62 of the compressed air supply system 260, powered and controlled by the power and control system 63, 263. Compressed air is supplied through the air channels 25 to the openings 23 of the nozzle 20 of the gun 10, 110, 210. In one of embodiments, the compressed air is heated by an air heater 269 shown in FIG. 22, fitted especially in the compressed air supply system 260, operating as an independent unit, or which is arranged in particular in the compressed air supply system 260, powered and controlled by the power and control system 63, 263. Moreover, the gun is connected to a power and control system 63, 263 to which, in particular, data is directly transmitted from the sensor 37 placed near the outlet 21 of the nozzle 20 of the gun 10, 110, 210, that can respond to changes of temperature and pressure in the hot melt adhesive container 24 of the gun 10, 110, 210. By reading the temperature and/or pressure values and communicating directly with the power and control system 63, 263, it is possible to react quickly to changes in temperature and/or pressure values and to precisely control the adhesive heater 265 and the gear pump 267 or pressure pump to maintain the adhesive temperature at the outlet 21 of the nozzle 20 of the gun 10, 110, 210 at the most suitable value for hot melt adhesive bonding.

Figure 23:
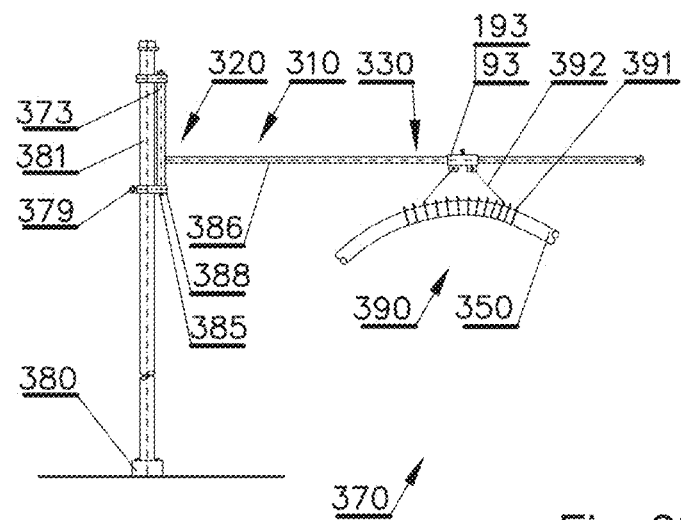
FIG. 23 shows schematically one of the embodiments of a system for suspending flexible elements, especially hoses.

FIG. 23 represents schematically one of the embodiments of a system 370 for suspending flexible elements, especially long flexible elements, in particular hoses. A flexible element within the meaning of the invention is an element which has no permanent form and bends under its own weight. Whereas a long flexible element is an element whose length is several times greater than the largest transverse dimension, for example, more than ten-fold greater. The system 370 for suspending flexible elements comprises a holder 390 for holding a flexible element 350, for example a rope or a hose, which is attached to the mobile system 93, 193 movable along the boom 330 which is attached to a stand 310, for example a pole 381, by means of an adjusting system 320 allowing for change of the distance of the boom 330 from the ground. The holder 390 comprises a spring 391 wound and movable on a flexible element 350, which means that an inner diameter of the spring 391 is larger than an outer diameter of the flexible element 350 and the flexible element can move relative to the spring. The spring 391 according to the example from FIG. 23 is suspended to the mobile system 93, 193 by at least one suspending element 392, for example a cord or wire with catches, whereby ends from one side of the suspending elements 392 are attached to the mobile system 93, 193, while other ends of the suspending elements 392 are attached to the spring 391 in an area of its center or in an area of its ends. In one of the embodiments, the function of the adjusting system is performed by the fixture of the boom 330, not shown in the drawing, to any movable structure or stationary element, for example a wall. The adjusting system 320 shown in FIG. 23 has at least two clamps 388 seated on the pole 381 of the stand 310 and a mandrel or pin 373 to which the boom 330 of the mobile system 93, 193 is attached. The clamps 388, for example, the upper clamp and the lower clamp, are fixed adjustable along the pole 381 of the stand 310, and at least one clamp, preferably the lower clamp, is locked relative to the pole 381 by a screw 379 at a selected distance from the ground, which prevents the position of the boom 330 from changing the selected distance from the ground. In another embodiment, clamps may be replaced by plates that are attached to the moveable structure or wall and that have seats for the mandrel, such as the seats of the clamps 388. The clamps 388 have seats 385 set off from the post 381 in which ends of the mandrel 373, which may move vertically, are pivotally seated around its vertical axis, which is performed by means of at least one screw 379 screwed into a threaded through-hole made in at least one clamp. The boom 330, for example a rod or pipe 386 of any cross-section, is permanently attached to the mandrel 373. The post has a base 380 that may be permanently fixed to the ground or to a movable element, such as a movable pallet or a cart that moves on the ground.

Figure 24:
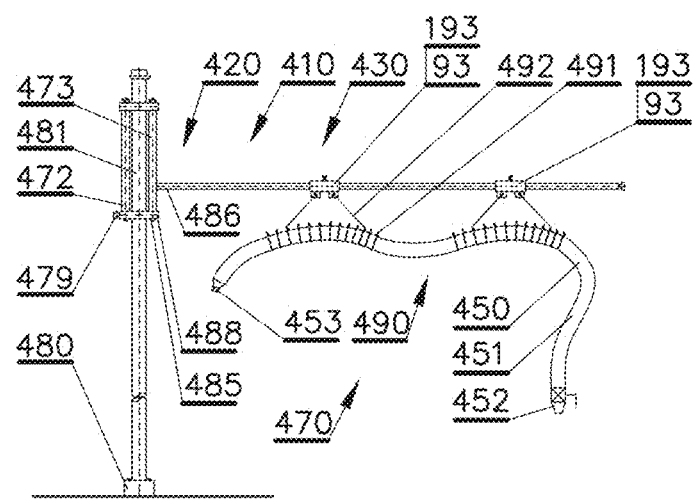
FIG. 24 shows schematically one of the embodiments of a system for suspending long flexible elements used for suspending hoses.

FIG. 24 shows another embodiment according to the invention of a system 470 for suspending very long flexible elements 450, e.g. hoses 451, especially connection hoses, with a connector 453 and a valve 452. Due to its build, the system 470 enables longer distance transport of the hot melt adhesive. The system 470 for suspending long flexible elements comprises holders 490, similar to the holders 390 of the system 370, for holding a long flexible element 450 in several points, each of which is attached to the mobile system 93, 193 movable along a boom 430, which is attached to a stand 410 by means of an adjusting system 420. Each holder 490 comprises a spring 491 wound and movable on the flexible element 450. According to the embodiment shown in FIG. 24, each spring 491 is suspended to the mobile system 93, 193 by at least one suspending element 492. The adjusting system 420 shown in FIG. 24 is similar to the adjusting system 320 shown in FIG. 23 and includes at least two clamps 488 seated on a pole 481 of the stand 410 and a mandrel 473 to which the boom 430 of the mobile system 93, 193 is attached, similarly to the embodiment from FIG. 23. The clamps 488 are connected by a strut 472, that prevents the mandrel 473 from falling out of seats 485 of the clamps 488, and at least one of the clamps is locked relative to the pole 481 with a base 480 by a setting screw 479 screwed into a threaded through hole until it touches the pole 481. The boom 430, for example a rod or pipe 486 of round or rectangular cross-section, is permanently attached to the mandrel 473.

Figure 25:
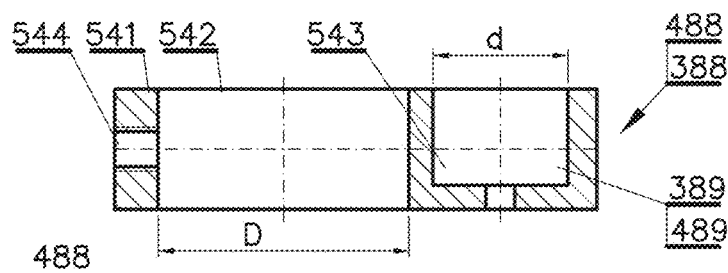
FIG. 25 shows a longitudinal section of a clamp seated on a pole.
Figures 26, 27:
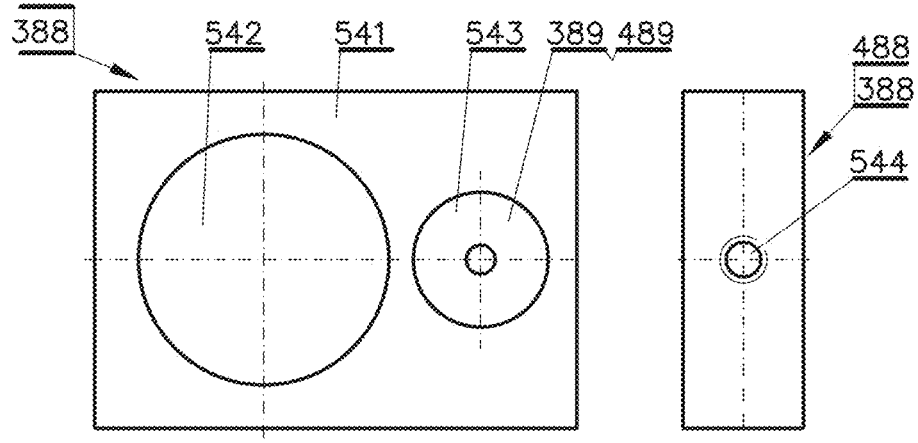
FIG. 26 shows a top view of the clamp shown in FIG. 25.
FIG. 27 shows a side view of the clamp shown in FIG. 25 seated on the pole.
Figure 28:
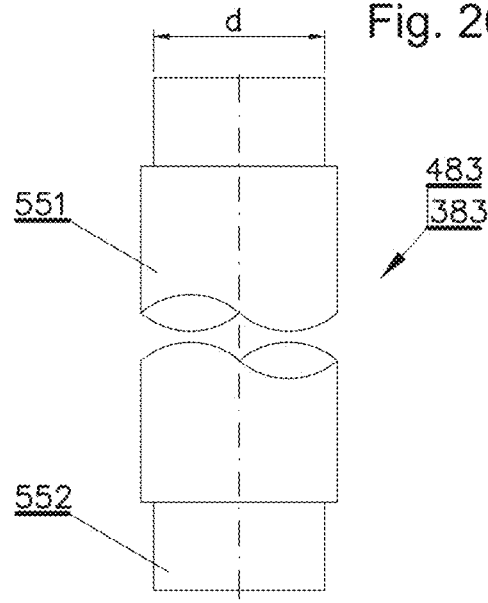
FIG. 28 shows a side view of a mandrel, to which a boom is attached.

FIGS. 25, 26 and 27 show the clamp 388, 488, that is attached to a stand's pole of one of the adjusting systems 320, 420 described above. FIG. 25 shows a longitudinal section of the clamp 388, 488, FIG. 26 shows a top view of the clamp shown in FIG. 25, and FIG. 27 shows a side view of the clamp shown in FIG. 25. The clamp 388, 488 has a shape of a rectangular plate 541 with a through hole 542 whose diameter D corresponds to an outer diameter of the pole, which is seated on the pole of the systems previously described. The diameter D is selected so that the clamp may be moved along the pole on which it is mounted. Moreover, the plate 541 has a cylindrical recess 543 with a diameter d, which forms a seat 389, 489 for seating the mandrel 383, 483, shown in FIG. 28, of the systems previously described. The clamp 388, 488 may be an upper clamp, in the seat or socket of which the top pivot of the mandrel 373, 473 is pivotally seated, and may be a lower clamp, in the socket of which the bottom pivot of the mandrel 373, 473 is pivotally seated, which in this embodiment is formed from a rod 551 with cylindrical-shaped sections 552 at its ends whose diameter d corresponds to the diameter d of the recess 543. Furthermore, the plate has a threaded hole 544 from its front side, into which a screw is screwed to lock the clamp relative to the pole on which the clamp is mounted. In one of the embodiments of the boom fixing to a movable structure or a stationary element, plates similar to the plate 541 shown in FIGS. 25, 26, and 27, comprising sockets only, are permanently fixed to the movable structure or the stationary element at such a distance that the mandrel to which the boom is attached has the ability to rotate around its own vertical axis.

With a system for suspending flexible elements that connect movable components and equipment, it is not necessary to remove the flexible elements from one set of holders and hang them from another when the distance between the components and equipment changes because the sections of the flexible elements may move together with the holders attached to the mobile systems that move on the booms.

Figure 29:
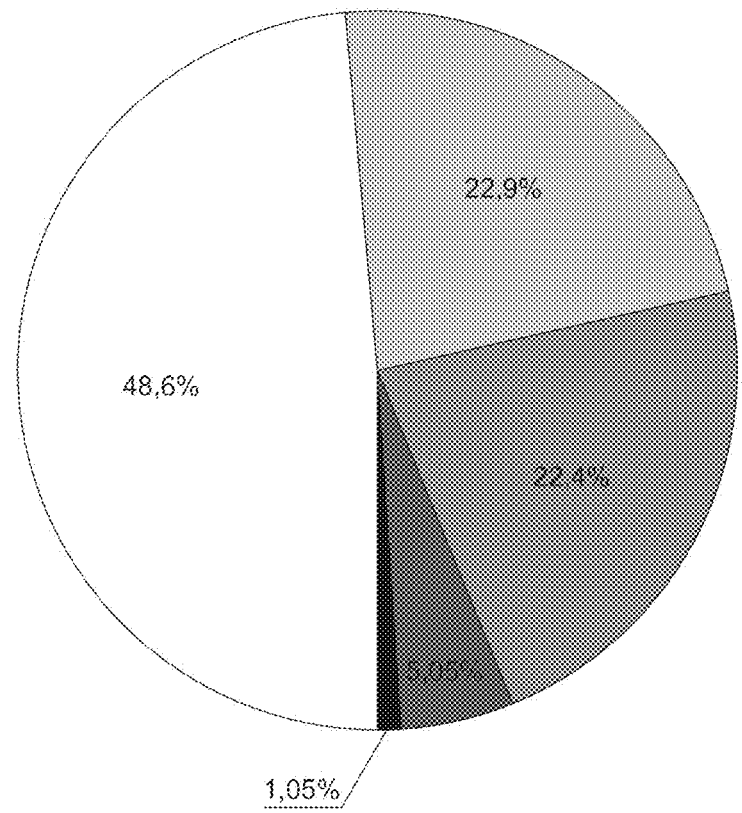
FIG. 29 shows a circular diagram of percentage by weight of ingredients in one embodiment of a hot-melt adhesive composition.

The adhesive used for gluing elements, especially those such as furniture upholstery elements, as well as those made of polyurethane foam, wood, metal, plastics, may be bonded with any hot melt adhesive. Composition of the adhesive has been shown in one of embodiments in FIG. 29.

In particular, the hot-melt adhesive composition is suitable for gluing using the system proposed by the invention or according to the invention, in particular the hot-melt adhesive containing by weight not more than 55.0% of hydrocarbon resin, not more than 6.0% of polybutene, not more than 1.5% of antioxidant, not more than 27.0% of copolymer mixture, and not more than 27.0% of polyolefin polymer. In one preferred embodiment, the hot-melt adhesive comprises 50.05% and, in another, 55.00% of hydrocarbon resin, in general between 50.05% and 55.00% of hydrocarbon resin, 5.05% and, in another, 6.00% of polybutene, in general between 5.05% and 6.00% of polybutene, 1.05% and, in another, 1.50% of antioxidants, in general between 1.05% and 1.50% of antioxidants, 21.50%, and, in another, 27.00% of polyolefin polymer, in general between 21.50% and 27.00% of polyolefin polymer, and copolymer mixture in an amount complementary to 100.00% of the components, i.e., a copolymer mixture of 22.35%, and, in another, 10.5%, in general between 10.5% and 22.35% of copolymer mixture. In another preferred embodiment, hot melt adhesive comprises 51.0% of hydrocarbon resin, 5.5% of polybutene, 1.2% of antioxidants, 16.8% of copolymer mixture and 25.5% of polyolefin polymer by weight. In yet another embodiment, the hot melt adhesive composition comprises 51.0% of hydrocarbon resin, 5.5% of polybutene, 1.2% of antioxidants, 16.8% of copolymer mixture and 25.5% of polyolefin polymer by weight.

An antioxidant known in the state of the art may be one of the polymer stabilizing products that is produced by companies, for example BASF, under Irganox trade name, and a copolymer mixture may be a polyolefin mixture. Preferably, the adhesive used for bonding based on the system proposed by the invention should have a viscosity of 2500 mPa·s, and, in another embodiment, of 2800 mPa·s, and in general between 2500 mPa·s and 2800 mPa·s, at a temperature between 120° C. and 200° C., and a density of 0.9 kg/dcm$^3$, and, in another embodiment, of 1.4 kg/dcm$^3$, and in general between 0.95 kg/dcm$^3$ to 1.4 kg/dcm$^3$, preferably between 0.9 kg/dcm$^3$ and 0.95 kg/dcm$^3$.

Figures 30, 31:
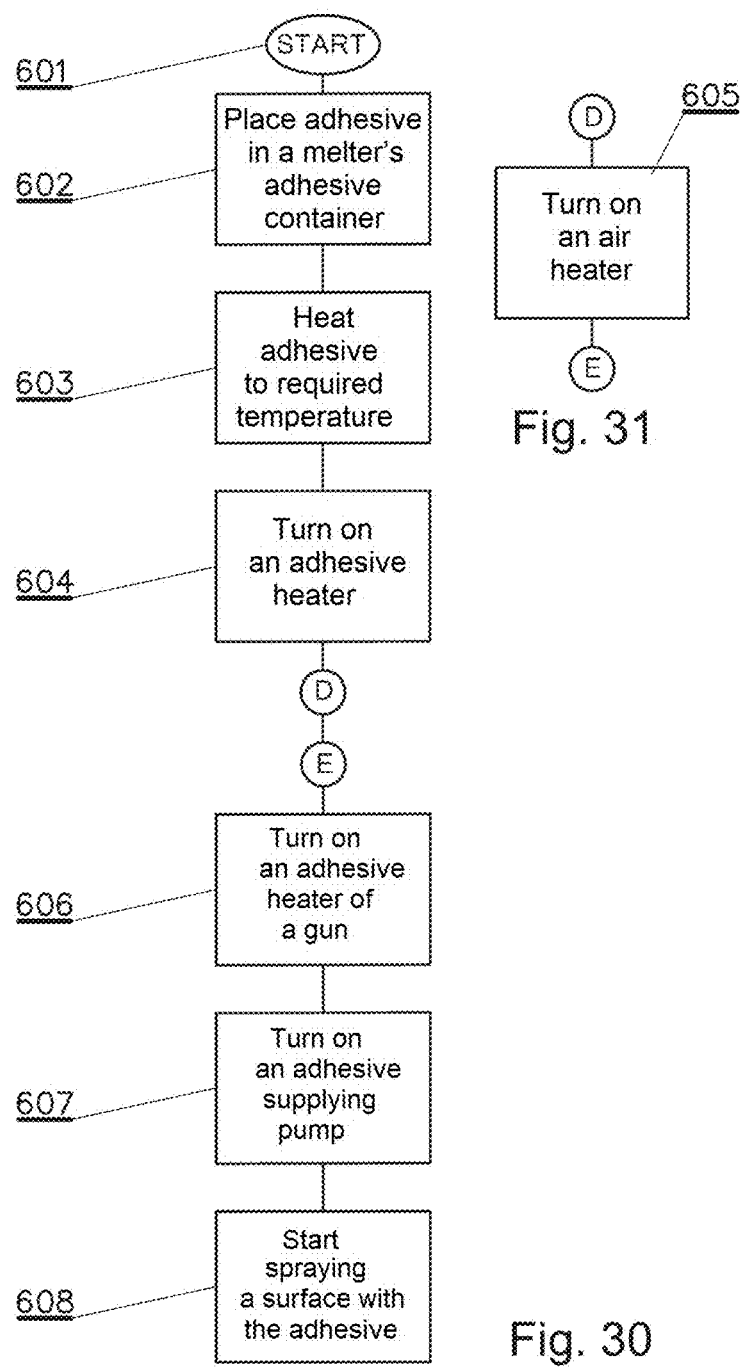
FIG. 30 and FIG. 31 show a block diagram of one of methods of preparing an adhesive ready for spraying a hot-melt adhesive on surfaces to be bonded.

FIG. 30 and FIG. 31 show a block diagram of one of the methods of preparing an adhesive ready for spraying a hot-melt adhesive on surfaces to be bonded, in particular surfaces of furniture elements and various materials, especially in the production of upholstered furniture. After starting in step 601, the hot-melt adhesive is placed in the melter's hot-melt adhesive container in step 602, which is then heated to the desired temperature in step 603. After heating adhesive in step 604, an air compressor is started, which pumps air at a pressure up to 1200 kPa, and in step 606 the adhesive heater in the gun is turned on, wherefore in step 607 an adhesive delivery pump is turned on, supplying hot melt adhesive with a viscosity of 2500 mPa·s, in one case, and 2800 mPa·s, in another, in general between 2500 mPa·s and 2800 mPa·s, and with a density of 0.8 kg/dcm$^3$, in one case, and 1.4 kg/dcm$^3$, in another, in general between 0.8 kg/dcm$^3$ and 1.4 kg/dcm$^3$, preferably between 0.9 kg/dcm$^3$ and 0.95 kg/dcm$^3$, and heated to a temperature of 120° C., in one case, and 200° C., in another, in general between 120° C. and 200° C., to the gun ferrule through a pipe placed in the hose in its insulating layer with a throughput of 0.5 kg/h, in one case, and 1.5 kg/h, in another, in general between 0.5 kg/h and 1.5 kg/h at a pressure of 1200 kPa, in one case, and 4200 kPa, in another, in general between 1200 kPa and 4200 kPa. The spraying of hot melt adhesive onto surfaces to be bonded begins in step 608 after the hot-melt adhesive has been filled into the adhesive container placed in the gun. In one embodiment, the air heater is optionally turned on in step 605 upon activation of the air compressor.

While the technical concept presented herein has been depicted, described, and has been defined with reference to particular preferred embodiments, such references and examples of implementation in the foregoing specification do not imply any limitation on the concept. It will, however, be evident that various modifications and changes may be made thereto without departing from the broader scope of the technical concept. The presented preferred embodiments are exemplary only, and are not exhaustive of the scope of the technical concept presented herein. Accordingly, the scope of protection is not limited to the preferred embodiments described in the specification, but is only limited by the claims that follow.

LIST OF REFERENCES 1, 101, 201 System for spraying a hot-melt adhesive
10, 110, 210 Gun
11, 111 Housing
12, 112 Wall
13 Ferrule
14 Needle
15 Channel
16, 116 Body
17, 117 Front wall
18, 118 Seal
19, 119 Conical protrusions
20, 120 Nozzle
21, 121 Hot-melt adhesive outlet or orifice
22 Threaded connection
23, 123 Air openings or air outlets
24, 124 Adhesive container
25, 125 Air channels or air ducts
26 Air line
27 Connector
28 Valve
29 Air ferrule
30 Wiring harness
31 Plug
32, 132, 232 Heater
33, 133, 233 Recess
35, 135 Wires
36 Electrical connector
37, 137 Temperature sensor
38, 138 Recess
39, 139 Wire
40, 140 Button
41 Spring element 42 Joint
43 Pusher
44 Spring
50, 150 Connection hose
51, 151 Protective layer
52, 152 Insulating layer
53, 156 Pipe
54, 55, 155 Screw connectors
56, 153 Air Pipe
57, 58,157 Connector
60, 260 Air Compressor
61,261 Melter
62 Motor
63, 263 Power and control system
64 Air hose
65 Air heater
70, 370, 470 System for suspending
79, 379, 479 Setting screw
80 System for suspending
81, 310, 410 Stand
82, 380, 480 Base
83 Weight
84 Stay
85, 385, 485 Seat
86 Arm
87 Tensioner
88, 388, 488 Clamp
90, 390, 490 Holder
91, 391, 491 Spring
92, 392, 492 Hanger
93, 193 Mobile system
94, 194 Housing
95 Snap-in holders
96, 196 Lock nut
97, 197 Bolt
98, 198 Bearing
113 Screw connector
129 Air connector
159 Splitter
192 Fixing element
195 Holders or handles with slings
264 Melter container
265 Adhesive heater
267 Gear pump
268 Motor or a pressure pump
269 Air heater
320, 420 Adjusting system
330, 430 Boom
350, 450 Flexible element
370 System for suspending flexible elements
373, 473 Mandrel
381, 481 Pole
386, 486 Pipe
389, 489 Seat
451 Hose
452 Valve
453 Connector
470 System for suspending very long flexible elements
472 Strut
601 Starting step
602 Step of placing an adhesive in an adhesive container
603 Step of heating an adhesive to desired temperature
604 Step of starting an air compressor
605 Step of turning on an air heater
606 Step of turning on an adhesive heater in a gun
607 Step of turning on an adhesive delivery pump
608 Step of starting to spray an adhesive onto surfaces

What is claimed is:

1. A system (1, 101, 201) for spraying hot-melt adhesive onto glued surfaces comprising
a melter (61) to heat hot-melt adhesive,
an air compressor (60, 260),
a power and control system (63, 263) and
a gun (10, 110) having a nozzle (20) with a hot-melt adhesive outlet or orifice (21) and a compressed air outlet (23) and connected to the melter (61, 261) by a pipe (53) with screw connectors (54, 55), through which a hot-melt adhesive being heated flows, and connected to the air compressor (60, 260) by an air pipe (56) with screw connectors (57, 58) through which a pressurized compressed air flows,
wherein the pipe (53) through which flows the hot-melt adhesive having a viscosity between 2500 mPa·s and 7000 mPa·s and a temperature between 120° C. and 200° C., and a density between 0.8 kg/dcm$^3$ and 1.4 kg/dcm$^3$, and the air pipe (56) are fitted in an insulating layer of a hose (50), and wherein the throughput of the pipe (53) through which the hot-melt adhesive being heated flows is between 0.5 kg/h and 1.5 kg/h, while the air pipe (56) has a throughput between 0.1 m$^3$/min and 0.6 m$^3$/min
and wherein at least one heater (32) and at least one temperature sensor (37) are located inside walls of the gun (10), which are in contact with a hot-melt adhesive container (24), and the at least one heater (32) and the at least one temperature sensor (37) are fitted in recesses (33, 38), respectively, placed in a wall (12) separating the hot-melt adhesive container (24) from an inner chamber of the gun (10)
and wherein a heater (232) is fitted by the nozzle (120) of the gun (110) and the at least one temperature sensor (37) is directly connected to a temperature controller of the power and control system (63, 263) controlling work of an adhesive heater (265) placed in the melter, with the goal of allowing a response of the adhesive heater (265) controlled by the power and control system (63, 263) to adhesive temperature fluctuations in the hot-melt adhesive container of the gun, and the inner chamber of the gun (10, 110) comprises a button (40, 140) pivotally mounted to a gun housing (11, 111) and protruding partially beyond the housing (11, 111), to which a pusher (43) with a needle is attached, the end of which reaches the hot-melt adhesive outlet or orifice (21) in order to prevent the adhesive from flowing out when the gun (10, 110) is not in use and inside of the inner chamber of the gun (10) is situated an inner air line (26) with a valve (28) that shuts down the flow of compressed air through the inner air line (26) when the button (40) acts on the valve (28), whereas the inner air line (26) connects an air ferrule (29) of the gun (10) with air channels (25) connected to the compressed air outlet.

2. The system (1, 101, 201) for spraying hot melt adhesive according to claim 1, wherein the hose (50) is suspended by means of a system (70, 370, 470) for suspension of flexible elements comprising a holder (90, 390, 490) for holding at least one house (50, 150), whereby the holder (90, 390, 490) is attached to a mobile system (93, 193) movable along a boom (330, 430), which is attached to a stand (310, 410) by means of an adjusting system (320, 420), which is an assembly of arm (330, 430) attached to a movable construction or steady element.

3. The system (1, 101) for spraying hot melt adhesive according to claim 2, wherein the holder (90, 390, 490)

comprises at least one spring (91, 391, 491) wound on the hose (50, 150), which is suspended by means of hangers (92, 392, 492) to at least one mobile system (93, 193), whereby ends of hangers (92, 392, 492) at one side are attached to the mobile system (93, 193) and other ends of hangers (92, 392, 492) are fixed at the area of the spring (91, 391, 491) ends or a spring middle.

4. The system (1, 101, 201) for spraying hot melt adhesive according to claim 2, wherein the adjusting system (320, 420) comprises a stand (310, 410) with a pole (81, 381, 481) and at least two clamps (88, 388, 488) seated on the pole (381, 481) of the stand (310, 410) and a mandrel (373, 473), to which a boom (330, 430) is connected, next to which the clamps (88, 388, 488), fastened along the stand's (381, 481) pole (381, 481) by a screw (79, 379, 479), have seats (389, 489), in which the mandrel (373, 473) is seated with its ends, rotatably around its vertical axis.

5. The system (1, 101, 201) for spraying hot melt adhesive according to claim 2, wherein the mobile system (93, 193) comprises an elongated bearing (98, 198) with a circular or rectangular internal cross-section with multiple rows of balls spaced evenly and in contact with an outer surface of the boom (330, 430), and which is fitted on the boom (330, 430), and which is placed in a housing (94, 194) with either snap-in holders (95) or slings (195).

6. The system (1, 101, 201) for spraying hot melt adhesive according to claim 1, wherein the pipe (53) through which the heated hot-melt adhesive flows is placed adjacent to the air pipe (56) and is in contact therewith within a section of the hose (50) in which the insulating layer (52) of the hose (50) is fitted.

7. The system (1, 101, 201) for spraying hot melt adhesive according to claim 1, wherein the air pipe (153) is fitted inside the pipe (156) through which the heated hot melt adhesive flows on a section of the hose (150) in which the insulating layer (152) of the hose (150) is fitted.

8. The system (1, 101, 201) for spraying hot melt adhesive according to claim 1, wherein the pipe through which the heated hot-melt adhesive flows is fitted inside the air pipe within a section of the hose (150) in which the insulating layer (152) of the hose (150) is fitted.

9. The system (1, 101, 201) for spraying hot melt adhesive according to claim 1, wherein the pipe (53, 156) through which the hot-melt adhesive flows is connected by one of the screw connectors (55, 155) of the pipe (53, 156) to a ferule (13) with a through-hole connecting an outlet or orifice of the pipe (53, 156) with the hot-melt adhesive container (24) placed in a front part of the gun (10).

10. The system (1, 101, 201) for spraying hot melt adhesive according to claim 1, wherein the compressed air outlet are air openings (23, 123) in a front wall (17) of the nozzle (20, 120) surrounding the hot-melt adhesive outlet A (21, 121), which is centrally placed in the nozzle (20, 120) and in the front wall of the nozzle (20, 120), and the hot-melt adhesive outlet (21) has a truncated cone shape whereas the air openings (23) have a longitudinal symmetry axis inclined at an angle (a) to a center axis of the nozzle, and at least one air opening (23) has the symmetry axis within a plane placed at a distance (a) from a plane passing through the longitudinal symmetry axis of the nozzle (20).

11. The system (1, 101, 201) for spraying hot melt adhesive according to claim 1 wherein the hot-melt adhesive for spraying with the system (1, 101, 201) for spraying hot-melt adhesive onto surfaces to be glued used for manufacture of upholstery furniture comprises by weight not more than 55.0% of hydrocarbon resin, not more than 6.0% of polybutene, not more than 1.5% of antioxidants, not more than 27.0% of copolymer mixture and not more than 27.0% of polyolefin polymer.

12. The system (1, 101, 201) for spraying hot melt adhesive according to claim 11, wherein the hot-melt adhesive comprises by weight 48.6% of hydrocarbon resin, 5.05% of polybutene, 1.05% of antioxidants, between 22.8% and 23.0% of polyolefin polymer, and a copolymer mixture in an amount complementary to 100.0% by weight.

13. The system (1, 101, 201) for spraying hot melt adhesive according to claim 12, wherein the hot-melt adhesive comprises by weight 22.9% of polyolefin polymer and 22.4% of copolymer mixture.

14. A method for spraying hot-melt adhesive onto glued surfaces using a system for spraying hot-melt adhesive onto glued surfaces comprising a melter (61) to heat hot melt adhesive, an air compressor (60), a power and control system (63), and a gun (10) connected to the melter (61) by a pipe (53) with screw connectors (54, 55) through which the heated hot melt adhesive flows, and connected to the air compressor (60) by an air pipe (56) with screw connectors (57, 58) through which the compressed air flows, and having a nozzle (20) with a hot melt adhesive outlet (21) and a compressed air outlet (23) directed towards surfaces to be bonded, wherein to an intake port of the gun through the pipe (53) through which the hot-melt adhesive flows fitted in a hose (50) inside its insulating layer with a throughput between 0.5 kg/h and 1.5 kg/h, is supplied under a pressure of 1200 kPa to 4200 kPa, a hot melt adhesive with a viscosity ranging from 2500 mPa·s to 2800 mPa·s and a density ranging from 0.8 kg/dcm$^3$ to 1.4 kg/dcm$^3$, heated to a temperature between 120° C. and 200° C., and through the air pipe (56) with a throughput of 0.1 m$^3$/min. to 0.6 m$^3$/min., placed in the hose (50) in its insulating layer in the area of the pipe through which the hot-melt adhesive flows, air is supplied at a pressure of 100 kPa to 1000 kPa to an air ferrule of the gun.

15. The method for spraying hot-melt adhesive onto glued surfaces according to claim 14, wherein the hot melt adhesive has the density ranging from 0.9 kg/dcm$^3$ to 0.95 kg/dcm$^3$.

\* \* \* \* \*